Figure 1:
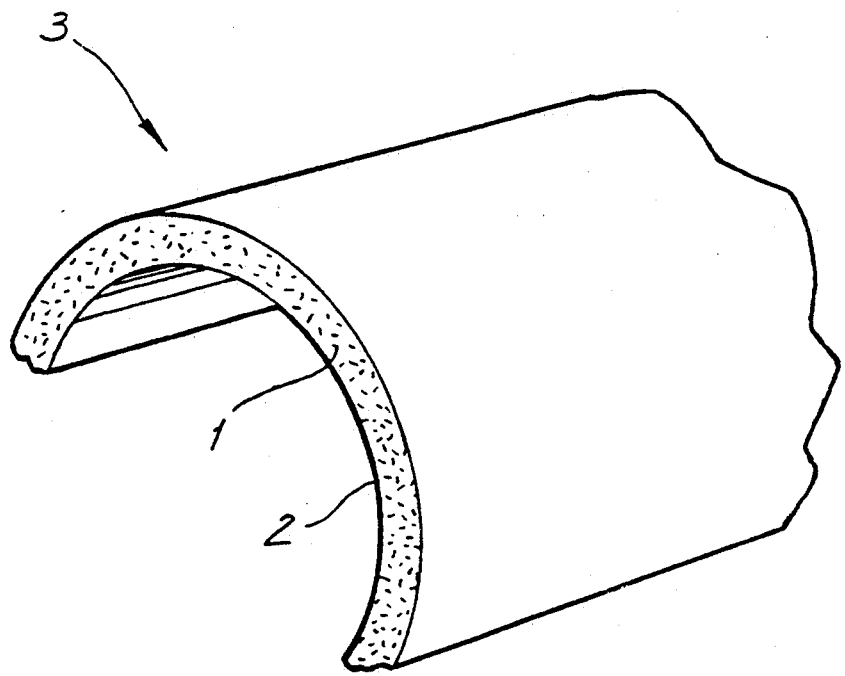

United States Patent
Carpenter

Patent Number: 5,272,679
Date of Patent: Dec. 21, 1993

[54] TOWED ARRAY JACKET

[75] Inventor: Allan L. Carpenter, Surrey Downs, Australia

[73] Assignee: Australia Sonar Systems Pty Ltd, Australia

[21] Appl. No.: 904,020

[22] Filed: Jun. 25, 1992

[30] Foreign Application Priority Data

Aug. 28, 1991 [AU] Australia ............... PK8061

[51] Int. Cl.[5] ............................. G01V 1/38
[52] U.S. Cl. ........................ 367/20; 367/154;
114/253; 174/101.5
[58] Field of Search ............ 174/101.5, 25 R, 122 R,
174/122 G; 367/20, 154, 169, 177, 106, 130;
114/253; 428/113, 902

[56] References Cited

U.S. PATENT DOCUMENTS

| | | | |
|---|---|---|---|
| 3,217,083 | 11/1965 | Gore | 174/25 |
| 3,900,543 | 8/1975 | Daub | 367/154 |
| 4,090,168 | 5/1978 | Miller et al. | 367/154 |
| 4,155,790 | 5/1979 | Galloway | 156/149 |
| 4,554,650 | 11/1985 | Brown et al. | 367/154 |
| 4,679,179 | 7/1987 | Lally | 367/162 |
| 5,089,668 | 2/1992 | Haney | 174/101.5 |

FOREIGN PATENT DOCUMENTS

1912068 10/1969 Fed. Rep. of Germany.
WO87/03379 6/1987 PCT Int'l Appl..

*Primary Examiner*—J. Woodrow Eldred
*Attorney, Agent, or Firm*—Oblon, Spivak, McClelland, Maier & Neustadt

[57] ABSTRACT

A jacket for a liquid filled towed array is formed from a composite material formed from short lengths (typically 2-4 mm) of reinforcing fibre (1) which are mixed with a thermoplastic material (2) to form the jacket (3). The reinforcing fibre (1) is preferably either glass fibre, aramid fibre, or carbon fibre or a mixture thereof and provides the desired high Tensile Modulus. The thermoplastic material (2) provides a relatively high level of viscoelastic damping (that is a high, or at least medium, Loss Tangent). The fibres (1) and thermoplastic material (2) are mixed, or compounded, by the material supplier and the material for the jacket (3) provided in granular form to the extrusion contractor. The manufacture of the jacket (3) is undertaken by normal extrusion processing.

6 Claims, 1 Drawing Sheet

TOWED ARRAY JACKET

The present invention relates to towed arrays and, in particular, the jackets for such towed arrays.

It has long been known that the properties of the material comprising the jacket of liquid-filled towed acoustic arrays act as a "mechanical filter". This filter removes unwanted noise, such as that resulting from boundary layer turbulence as the array is towed through the water, whilst allowing the transmission of wanted acoustic signals with little attenuation. This "filtering" function is most influenced by two material properties of the jacket, namely its elastic strength and damping. In the terminology of material science, these properties are Tensile Modulus (Youngs Modulus) and the Loss Tangent (that is the ratio of the real and complex parts of the Tensile Modulus determined under dynamic conditions).

Theoretical studies of the towed array's filtering function indicate that an array jacket (termed a hosewall) will provide the most effective filtering when both the Tensile Modulus and the Loss Tangent have a high value. However, unfortunately the simultaneous presence of high values for both properties in a single material is virtually unknown. If fact, for most known engineering materials, a high value of one property tends to preclude a high value of the other. Thus, materials with a high Tensile Modulus, such as glass fibre, aramid (KEVLAR) fibres, and carbon fibres exhibit very low (substantially zero) damping, whilst the materials used in damping applications such as pitch and plastic putties (mastics) exhibit a very low (substantially zero) Tensile Modulus.

Therefore, in general, the choice of the material or materials from which the jacket has been made, has been a compromise to obtain hitherto acceptable, but not high, values of both the Tensile Modulus and the Loss Tangent.

A further practical consideration which has hitherto been taken into account is that prior art liquid filled towed arrays used methods of assembly which require the jacket or hosewall to be expanded (non-collapsed) by the application of an interior pressure for insertion of the interior components within the hose wall. This requirement placed a practical limit on the Tensile Modulus and, in particular, the tangential Tensile Modulus, of the jacket as a whole.

The present invention seeks to overcome this fundamental problem in material science by the provision of a jacket having both a Tensile Modulus and Loss Tangent which are as high as possible. The present invention finds particular application in the production of modular towed arrays of the type disclosed in Australian Patent Application No. PK5569 lodged Apr. 11, 1991 (now Patent Application No. 14795/92) in the name of Australia Sonar Systems Pty Ltd, since the assembly of such a modular array does not require the application of interior pressure to the jacket or hose wall in order to enable the interior components to be inserted within each module of the array.

According to one aspect of the present invention there is disclosed a jacket for a liquid filled towed array, said jacket comprising a two part combination of materials, one of said parts comprising fibres of high Tensile Modulus and the other one of said parts comprising a plastics material of high damping characteristics, said first part being embedded in said second part. One preferred form comprises short chopped lengths of the fibres substantially randomly oriented and distributed throughout the second part. Another preferred form comprises the fibres extending circumferentially relative to the generally hollow cylindrical jacket and being embedded in a covering of the plastics material.

In accordance with a second aspect of the present invention there is disclosed methods of fabricating a jacket for a liquid filled towed array, the methods being as disclosed in the embodiments thereof to be described hereafter.

Figure 2:
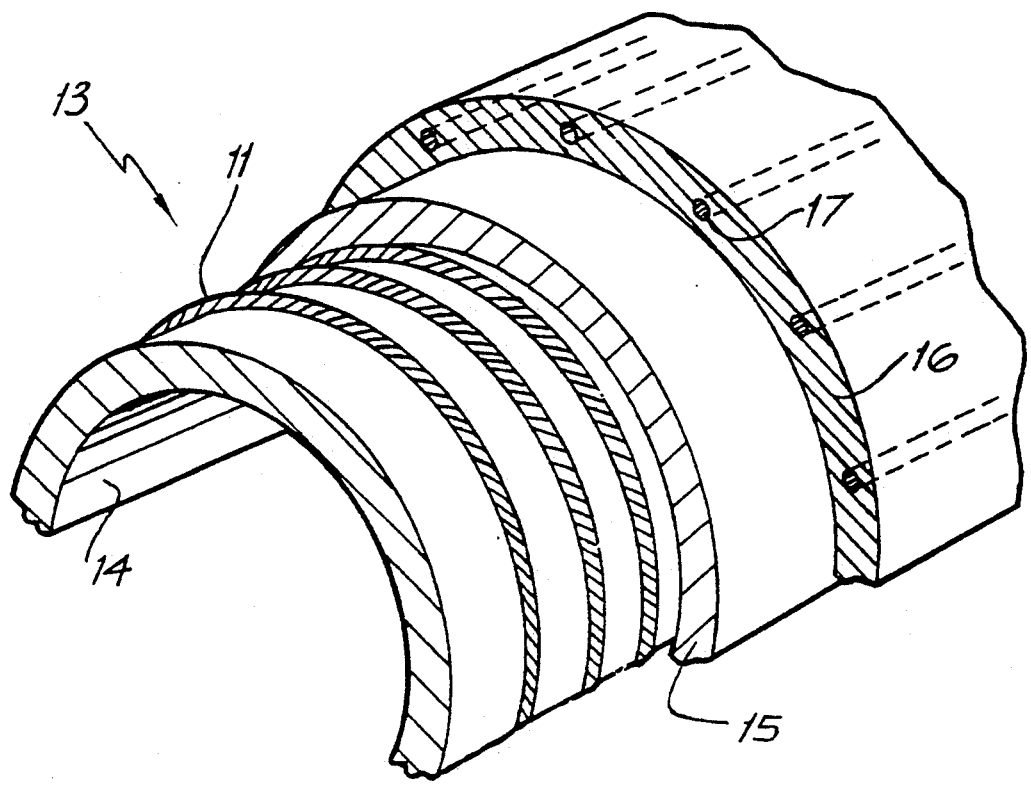

Two embodiments of the present invention will now be described with reference to the drawings in which:

FIG. 1 is a fragmentary partially cross-sectioned perspective view of a jacket in accordance with a first embodiment of the present invention, and FIG. 2 is a view similar to FIG. 1 but of a jacket of the second embodiment of the present invention.

Theoretical studies of the filtering function of the hosewall of the array have indicated that ideally a high circumferential Tensile Modulus is required to limit "bulge wave" propogation but that a low axial or longitudinal Tensile Modulus is preferable to limit the transmission of axial vibrations. In addition, a low sheer modulus is ideally required to limit the transmission, by viscous sheer, of vibrational energy through the hosewall or jacket. Such vibrational energy is input to the jacket via its outer boundary from the boundary layer turbulence caused by the array being towed through the water.

A first embodiment of a composite material that can provide the required combination of high Tensile Modulus and high Loss Tangent will now be described with reference to FIG. 1. The composite material is formed from short lengths (typically 2–4 mm) of reinforcing fibre 1 which are mixed with a thermoplastic material 2 to form the jacket 3. The reinforcing fibre 1 is preferably either glass fibre, aramid fibre, or carbon fibre or a mixture thereof and provides the desired high Tensile Modulus. The thermoplastic material 2 provides a relatively high level of viscoelastic damping (that is a high, or at least medium Loss Tangent). The fibres 1 and thermoplastic material 2 are mixed, or compounded, by the material supplier and the material for the jacket 3 provided in granular form to the extrusion contractor. The manufacture of the jacket 3 is undertaken by normal extrusion processing.

As indicated in FIG. 1, the "chopped" fibres 1 adopt a substantially random orientation in the resulting extrudate thereby resulting in the jacket 3 having relatively homogeneous mechanical properties. As a consequence, substantially uniform values of the Tensile Modulus and Sheer Modulus in each of the three orthogonal axes are obtained. The fibres 1 provide the increased value of the Tensile Modulus desired of the jacket 3, and the thermoplastic material 2 provides the damping. Suitable thermoplastic materials include (EVA).

The overall, or averaged, values of the Tensile Modulus, sheer modulus and Loss Tangent of the jacket 3 will depend upon the same properties of the fibres 1 and material 2, and also upon the length of the fibres 1, the ratio of the fibres 1 to thermoplastic material 2, and the adhesion between the fibres 1 and thermoplastic material 2.

The above described arrangement results in an improvement over the single materials currently available, however, two relatively minor drawbacks still remain.

These are that as the jacket 3 provides the functional integrity of the array, it must be impermeable to the, typically paraffin-based, fill fluid. Thus the thermoplastic material 2 must represent a compromise between damping, tensile strength, and the necessary impermeability.

Secondly, the random orientation of the fibres 1 provides some load transfer in the axial direction, which is clearly not preferred, and can also increase the sheer modulus in all axes, contrary to the desired minimising of this property.

These two drawbacks with the first embodiment lead to the second embodiment of the present invention which will now be described with reference to FIG. 2. As seen therein, the overall jacket 13 is formed from an inner jacket 14 of conventional hosewall material such as polyvinyl chloride (PVC) or polyurethane thermoplastic, which material has a low permeability to the paraffin-based fill fluid and is also relatively strong. The inner jacket 14 is overwound with a spiral of continuous reinforcing fibre 11. As before the fibre 11 can be glass, aramid or carbon fibres, however, metals such as high tensile steel are also suitable. A mixture of various types of fibre could also be used. The diameter and pitch of the fibre 11 are able to be selected to suit.

Over this fibre 11 is extruded an intermediate layer 15 of very high damping material, such as a hot-melt EVA. This intermediate layer 15 bonds strongly to both the fibres 11 and the inner jacket 14.

Preferably, in order to complete the jacket 13, the intermediate layer 15 is covered by an extruded tough outer jacket 16, preferably of a polyurethane thermoplastic. If desired, within the outer jacket 16 can be embedded longitudinally extending strength members 17 are preferably of aramid fibre. The strength members 17 are preferably co-extruded with the outer jacket 16.

It will be apparent that the fibre 11 provides continuous, unbroken reinforcing along the tangential axis (or circumferential direction) but leaves the jacket strength in the axial direction substantially unchanged. The intermediate layer 15 of high damping material provides low sheer strength across the jacket 13 and the required high damping in all three orthoganal axes. The preferred co-extrusion of the strength member 17 with the outer jacket 16 provides the required load transfer from the strength members 17 through the jacket 13 to any winch or array handling system (not illustrated), but these strength members 17 (which can carry axial vibrations) are isolated from the array interior by the intermediate damping layer 15.

It will be apparent to those skilled in the art that the above described arrangements provide, to a large extent, the nonhomogeneous mix of material properties sought for increasing the acoustic performance of the towed array. It will be apparent that the first embodiment is relatively inexpensive to implement, but more limited in its effectiveness whilst the second embodiment is of increased effectiveness, but is more expensive to implement. As a consequence, which one of the two above described embodiments of the present invention will be implemented in a particular array, will depend upon a compromise of economic and performance factors. However, irrespective of which embodiment is selected, the result is an improved performance over the prior art.

The foregoing describes only two embodiments of the present invention and modifications, obvious to those skilled in the art, can be made thereto without departing from the scope of the present invention.

What I claim is:

1. A jacket for a liquid filled towed array, said jacket being hollow and cylindrical and comprising an inner layer, one or more fibers of high Tensile Modulus extending generally circumferentially over said inner layer, an intermediate layer of a high damping plastics material bonded to said inner layer and having said one or more fibers embedded therein, and an outer layer provided over said intermediate layer, said outer layer having longitudinal strength members embedded therein, wherein said one or more fibers are selected from the group consisting of glass fiber, aramid fibers, carbon fibers, or high tensile steel fiber.

2. A jacket according to claim 1 wherein said inner layer is selected from the group consisting of polyvinyl chloride and polyurethane thermoplastic.

3. A jacket according to claim 1, wherein said strength members are aramid fibers.

4. A method of manufacturing a jacket for a liquid filled towed array, the method comprising the steps of:
providing an inner layer;
winding one or more fibers of high Tensile Modulus generally circumferentially over said inner layer, said fibers being selected from the group consisting of glass fibers, aramid fibers, carbon fibers, and high tensile steel fibers; extruding an intermediate layer of high damping plastics material over said inner layer so that said fibers are embedded in said intermediate layer; and
extruding an outer layer over said intermediate layer, said outer layer having longitudinal strength members embedded therein.

5. A method according to claim 4, wherein said inner layer is of a material selected from the group consisting of polyvinyl chloride and polyurethane thermoplastic.

6. A method according to claim 4, wherein said strength members are aramid fibers.

* * * * *